United States Patent

[11] 3,625,969

| [72] | Inventor | Alberto Rossi<br>Oberwil, Switzerland |
|---|---|---|
| [21] | Appl. No. | 674,129 |
| [22] | Filed | Oct. 10, 1967 |
| [45] | Patented | Dec. 7, 1971 |
| [73] | Assignee | Ciba Corporation<br>New York, N.Y. |
| [32] | Priorities | Oct. 20, 1966 |
| [33] | | Switzerland |
| [31] | | 15318/66;<br>Aug. 18, 1967, Switzerland, No. 11663/67 |

[54] 6-SULFAMYL-4-HYDROXY-3-CARBOXY-QUINOLINES
9 Claims, No Drawings

[52] U.S. Cl. .................................................. 260/247.1,
260/243 B, 260/268 BQ, 260/287 R, 424/232,
424/248
[51] Int. Cl. ......................................................... C07d 87/46
[50] Field of Search........................................... 35/4.5 C,
101; 260/287 R, 247.1, 243 B, 268 BQ

*Primary Examiner*—Alex Mazel
*Assistant Examiner*—Jose Tovar
*Attorneys*—Harry Goldsmith, Joseph G. Kolodny and Bryant W. Brennan ABSTRACT: Compounds of the formula

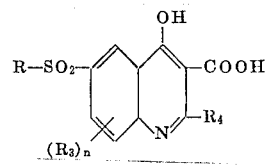

in which
R = disubstituted amino group
$R_3$ = lower aliphatic hydrocarbon radical, lower alkoxy group, lower alkenyloxy group, hydroxy group, halogen, trifluoromethyl
$n$ = integer from 0 to 3
$R_4$ = lower aliphatic hydrocarbon radical for example:
3-carboxy-4-hydroxy-6-(morpholinosulfamyl)-quinoline.
Use: anti-inflammatory agents.

6-SULFAMYL-4-HYDROXY-3-CARBOXY-QUINOLINES

SUMMARY OF THE INVENTION

The present invention relates to new quinolines. Especially it concerns 4-hydroxyquinolines substituted in position 3 by a free carboxyl group and in position 6 by a disubstituted sulfamyl group, their salts, pharmaceutical compositions containing these compounds, and a process for inhibiting inflammations.

The new compounds have a valuable pharmacological, especially an anti-inflammatory and antirheumatic action.

DISCLOSURE OF THE PREFERRED EMBODIMENT

The quinoline ring in the new compounds may be further substituted, for example in one or several of the substitutable positions. The substitutents may be identical or different.

Thus, the carbocyclic part of the quinoline ring may carry one or several substituents, for example lower aliphatic hydrocarbon residues, especially lower alkyl residues, for example methyl, ethyl, n-propyl or isopropyl radicals; butyl, pentyl or hexyl radicals which may be linear or branched in any desired position; lower alkoxy residues, for example methoxy, ethoxy, n-propoxy or isopropoxy residues; butoxy, pentoxy or hexoxy residues which may be linear or branched in any desired position; lower alkenyloxy residues, for example allyloxy or methallyloxy residues; hydroxyl groups or halogen atoms, for example fluorine, chlorine or bromine atoms or the pseudohalogen trifluoromethyl.

The heterocyclic part of the quinoline ring may be substituted in position 2, for example by lower aliphatic hydrocarbon residues, for instance by lower alkyl such as methyl, ethyl, n-propyl or isopropyl radicals.

The sulfamyl groups in position 6 is a disubstituted sulfamyl group in which the substituents are preferably lower aliphatic hydrocarbon residues, for example lower alkyl, alkenyl or possibly alkylene radicals, for example methyl, ethyl, propyl or isopropyl radicals; butyl, pentyl, hexyl or heptyl radicals which may be linear or branched in any desired position; allyl or methallyl radicals, alkylene radicals with 4 to 6 chain members, such as butylene-(1,4), peneylene-(1,5), hexylene-(1,5), hexylene-(1,6), or heptylene-(2,6) radicals; aliphatic hydrocarbon residues interrupted by hetero atoms such as oxygen, nitrogen or sulfur atoms, such as oxa-, aza- or thia-alkylene radicals, particularly those with 5 or 6 chain members, e.g. 3-oxa-, 3-aza- or 3-thia-pentylene-(1,5), 3-aza-hexylene-(1,6), 3-lower alkyl-3-aza-pentylene-(1,5), or 4-methyl-4-aza-heptylene-(2,6) radicals.

The new compounds possess valuable pharmacological properties. Inter alia, in addition to an anti-rheumatic effect they have above all an anti-inflammatory effect as can be shown in animal experiments, e.g. in rats. The new compounds can therefore be used as antiphlogistic and anti-rheumatic agents. The new compounds are also valuable intermediates for the manufacture of other useful substances, especially pharmacologically active compounds.

Particularly valuable are compounds of the formula

I
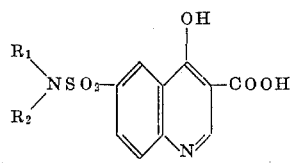

in which $R_1$ and $R_2$ each represents a lower alkyl radical, for example one of those mentioned above, especially a methyl, ethyl, propyl or isopropyl radical, or in which $R_1+R_2$ represent an alkylene radical, which may be interrupted by a hetero atom, such as an oxygen, sulfur or lower alkylated nitrogen atom, and which forms with the nitrogen atom a ring, for example a possibly lower alkylated piperidino, pyrrolidino, hexamethylenimino, octahydroazocino, morpholino, thiamorpholino or N-lower alkylated piperazino ring, such as the N-methyl-piperazino ring.

Special mention because of their anti-inflammatory effect, deserve 3-carboxy-4-hydroxy-6-piperidinosulfonylquinoline and 3-carboxy-4-hydroxy-6-morpholinosulfonylquinoline of the formula II
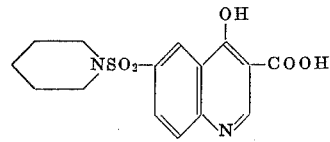

III
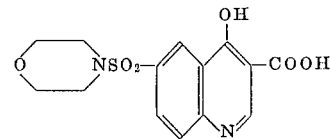

and their alkali metal salts which for example in rats on subcutaneous administration of a dose from 50 to 100 mg. per kilogram of bodyweight display a pronounced anti-inflammatory effect.

The new compounds are obtained by known methods, for example by hydrolyzing a 3-X-4-hydroxyquinoline that contains in position 6 a disubstituted sulfamyl group, and in which X represents a esterified carboxyl group such as a lower carbalkoxy group.

The hydrolysis is carried out in the usual manner, for example in the presence of an acid or a base, preferably in the presence of a solvent and optionally in the presence of an oxidizing agent, such for example as hydrogen peroxide.

Depending on the starting materials and reaction conditions used the final products are obtained in the free form or in the form of their salts, which are likewise included in this invention, for example basic, neutral, acid or mixed salts, possibly also their hemi-, mono-, sesqui-orpoly-hydrates, or salts with bases such as metal salts, for example alkali metal salts or alkaline earth metals salts. The salts of the new compounds may be converted in known manner into the free compounds. Thus, for example, the acid addition salts can be converted by treatment with a basic agent, for example an alkali or ion exchange resin, into the corresponding free bases. The acid addition salts are advantageously formed with therapeutically useful acids, for example with hydrohalic, sulfuric or phosphoric acids, nitric or perchloric acid; or with aliphatic, alicyclic, aromatic or heterocyclic carboxylic or sulfonic acids such as formic, acetic, propionic, succinic, glycollic, lactic, malic, tartaric, citric, ascorbic, maleic, hydroxymaleic or pyruvic acid; phenylacetic, benzoic, para-aminobenzoic, anthranilic, para-hydroxybenzoic, salicyclic, para-aminosalicylic, embonic, methanesulfonic, ethanesulfonic, hydroxyethanesulfonic, ethylenesulfonic, acid; halogen-benzenesulfonic, toluenesulfonic, naphthalenesulfonic, or sulfanilic acid; methionine, tryptophan, lysine or arginine.

These or other salts of the new compounds, for example their picrates, may also be used for purifying the free compounds obtained by converting the free bases into salts. Separating the salts and liberating the free compounds from the salts. In view of the close relationship between the new compounds in the free form and in the form of their salts, what has been said above and below concerning the free compounds relates also to the corresponding salts wherever this is possible and suitable.

The invention includes also any variant of the present process in which an intermediate obtained at any stage of the process is used as starting material and any remaining step or steps is or are carried out or the process is discontinued at any stage thereof, in in which a starting material is formed in situ or a reactant may be used in the form of a hydrate or salt thereof.

In carrying out the reactions according to the invention it is of advantage to use starting materials which lead to the above especially mentioned groups of final products and particularly to those primarily outstanding final products.

The starting materials are known or, if they are new, may be prepared in a manner known per se.

The 4-hydroxyquinoline compounds that contain in the 6-position a disubstituted sulfamyl group and in the 3-position an esterified carboxyl group may be prepared by the usual methods, for example by reacting an aniline which carries in para-position a disubstituted sulfamyl group and which may be further substituted on the phenyl ring, with an alkoxy-methylene-malonic ester ester, accompanied by elimination of alcohol. The resulting sulfamylanilines whose sulfamyl group is disubstituted and whose amino group contains as the only substituent a possibly substituted $\beta$-R-$\beta$-R'-ethenyl radical in which R' and R each represents an esterified carboxyl group, for example a carbo-lower alkoxy group, may be converted into the starting materials by cyclization.

The cyclization is carried out in the usual manner, inter alia by heating, e.g. in the presence of a suitable inert solvent, for example diphenyl ether, in the presence or absence of a condensing agent or of a dehydrating agent such as acetic anhydride, concentrated hydrochloric acid, concentrated sulfuric acid or polyphosphoric acid;

The aforementioned starting materials also have the valuable pharmacological activity indicated for the final products, and are also a subject of the invention.

The new compounds may be used, for example, in the form of pharmaceutical preparations containing them in the free form or in the form of their therapeutically acceptable salts in conjunction or admixture with an organic or inorganic, solid or liquid pharmaceutical excipient suitable for local, enteral or parenteral administration. Suitable excipients are substances that do not react with the new compounds, for example water, gelating, lactose, starches, stearyl alcohol, magnesium stearate, talcum, vegetable oils, benzyl alcohols, gums, propyleneglycols, white petroleum jelly or other known medicinal excipients. The pharmaceutical preparations may be, for example, tablets, dragees, capsules, ointments, creams or suppositories, or in liquid form solutions, suspensions or emulsions. They may be sterilized and/or contain adjuvants such as preserving, stabilizing, wetting or emulsifying agents, solution promoters, salts for regulating the osmotic pressure of buffers. They may also contain other therapeutically valuable substances. The pharmaceutical preparations are formulated by the usual methods.

The following examples illustrate the invention.

EXAMPLE 1

A solution of 10 g. of 3-carbethoxy-4-hydroxy-6-dimethyl-sulfamyl-quinoline in 100 ml. of ethanol is mixed with 100 ml. of 2N-sodium hydroxide solution and heated for 2 hours on a water bath. The bulk of the ethanol is removed in a rotary evaporator under vacuum and the residue acidified with glacial acetic acid. The solid precipitate is recrystallized from aqueous dimethylformamide, to yield 3-carboxy-4-hydroxy-6-(dimethylsulfamyl)-quinoline of the formula

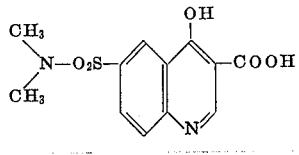

in the form of colorless crystals melting at 285° to 286° C. with decomposition.

The starting material is sued in this example, the 3-carbethoxy-4-hydroxy-6-(dimethylsulfamyl)-quinoline, may be prepared as follows:

A mixture of 20 g. of 4-(dimethylsulfamyl)-aniline and 21.6 g. of ethoxymethylene-malonic acid diethyl ester is heated for 30 minutes at 110° C. with ethanol passing over. The reaction mass is cooled to 50° C. taken up in petroleum ether and cooled in an ice bath. The precipitated [4-(dimethyl-sulfamyl)-anilino]-methylenemalonic acid diethyl ester is filtered off; it melts at 109° to 110° C. 15 grams of this ester are dissolved in 50 ml. of diphenyl ether, and this solution is heated at the boil for 15 to 20 minutes, whereupon a white precipitate settles out; the whole is cooled, mixed with petroleum ether and the solid substance is filtered off. After recrystallization from dimethylformamide the 3-carbethoxy-4-hydroxy-6-(dimethylsulfamyl)-quinoline melts at 325° C. with decomposition.

EXAMPLE 2

A solution of 13 g. of 3-carbethoxy-4-hydroxy-6-(diethyl-sulfamyl)-quinoline in 100 ml. of ethanol is mixed with 100 ml. of 2N-sodium hydroxide solution and heated for 2 hours on a water bath. The bulk of ethanol is evaporated and the aqueous solution acidified with 2N-hydrochloric acid. The solid precipitate is filtered off and recrystallized from aqueous dimethylformamide, to furnish 3-carboxy-4-hydroxy-6-(diethyl-sulfamyl)-quinoline of the formula

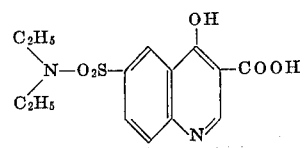

in the form of colorless crystals melting at 276° to 278° C. with decomposition.

The 3-carbethoxy-4-hydroxy-6-diethylsulphamyl)-quinoline used as starting material in this example may be prepared as described in example 1 for the manufacture of 3-carbethoxy-4-hydroxy-6-dimethylsulphamyl-quinoline. The [4-(diethyl-sulphamyl)-anilino]-methylenemalonic acid diethyl ester melts at 100° C. and the 3-carbethoxy-4-hydroxy-6-diethyl-sulphamyl-quinoline obtained from it melts at 315° C. with decomposition.

EXAMPLE 3

A solution of 12 g. of 3-carbethoxy-4-hydroxy-6-(dipropyl-sulphamyl)-quinoline in 100 ml. of ethanol is mixed with 100 ml. of 2N-sodium hydroxide solution and heated for 2 hours on a water bath. The bulk of ethanol is evaporated under vacuum, the residue cooled and acidified with 2N-hydrochloric acid, and the precipitated solid substance is filtered off and recrystallized from dimethylformamide, to yield 3-carboxy-4-hydroxy-6-dipropylsulphamyl-quinoline of the formula

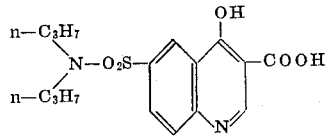

in the form of colorless crystals melting at 265° to 267° C. with decomposition.

The 3-carbethoxy-4-hydroxy-6-(dipropylsulphamyl)-quinoline used as starting material in this example may be prepared as follows:

100 grams of 4-acetamino-benzenesulphonylchloride are stirred portionwise into a mixture of 1 liter of water and 200 ml. of dipropylamine. After 3 hours the mixture is extracted with ethyl acetate, washed with water and evaporated under vacuum. 100 grams of the crude, oily 4-(dipropylsulphamyl)-acetanilide are mixed with 1 liter of 2N-hydrochloric acid and heated for 3 hours on a water bath, then cooled and the acid solution is rendered alkaline with concentrated ammonia and extracted with methylenechloride. The methylene chloride extract is evaporated and the residue recrystallized from methylenechloride+petroleum ether, to yield 4-(dipropyl-sulphamyl)-aniline boiling at 118° to 120° C. A mixture of 55 g. of this compound with 50 g. of ethoxymethylene-malonic acid diethyl ester is heated for 30 minutes at 140° C. during which ethanol escapes. The cooled, solid reaction product is recrystallized from ethanol+petroleum ether, to yield 4-(dipropylsulphamyl)-anilino-methylene malonic acid diethyl ester melting at 95° to 98° C.; it is cyclized in boiling diphenyl ether, whereby 3-carbethoxy-4-hydroxy-6-(dipropylsulphamyl)-quinoline, melting at 295° to 298° C., is formed.

EXAMPLE 4

A solution of 13 g. of 3-carbethoxy-4-hydroxy-6-(piperidino-sulphonyl)-quinoline in 100 ml. of ethanol is mixed with 130 ml. of 2N-sodium hydroxide solution and refluxed for 3 hours. The bulk of ethanol is distilled off under vacuum, the aqueous alkaline solution is mixed with animal charcoal, filtered acidified with 2N-hydrochloric acid and the solid precipitate is suctioned off and recrystallized from aqueous dimethyl-formamide, to yield 3-carboxy-4-hydroxy-6-(piperidinosulphonyl)-quinoline of the formula

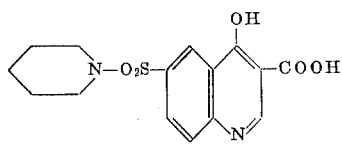

in the form of colorless crystals melting at 290° to 292° C. with decomposition.

The 3-carbethoxy-4-hydroxy-6-(piperidinosulphonyl)-quinoline used as starting material in this example is obtained as described in example 3 for the manufacture of 3-carbethoxy-4-hydroxy-6-dipropylsulphamyl-quinoline. 4-(Piperidinosulphonyl)-acetanilide melts at 81° C., 4-(piperidinosulphonyl)-aniline at 108° to 110° C., and 4-(piperidinosulphonyl)-anilino-methylene-malonic acid diethyl ester at 105° to 107° C. The 3-carbethoxy-4-hydroxy-6-(piperidinosulphonyl)-quinoline obtained from it from boiling diphenyl ether melts at 320° C. with decomposition.

EXAMPLE 5

A solution of 13 g. of 3-carbethoxy-4-hydroxy-6-(morpholino-sulphonyl)-quinoline in 100 ml. of ethanol is mixed with 130 ml. of 2N-sodium hydroxide solution and refluxed for 3 hours. The bulk of ethanol is distilled off under vacuum, the aqueous alkaline solution mixed with animal charcoal, filtered, acidified with 2N-hydrochloric acid and the precipitate is suctioned off, to yield on recrystallization from aqueous dimethylformamide 3-carboxy-4-hydroxy-6-(morpholino-sulphonyl)-quinoline of the formula

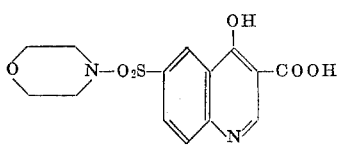

in the form of colorless crystals melting at 293° to 295° C. with decomposition.

The 3-carbethoxy-4-hydroxy-6-(morpholinosulphonyl)-quinoline used as starting material in this example is prepared as described in example 3 for the manufacture of 3-carbethoxy-4-hydroxy-6-(dipropylsulphamyl)-quinoline. 4-Morpholinosulphonyl)-acetanilide melts at 108° to 111° C. 4-(morpholinosulphonyl)-aniline at 214° to 215° C. and 4-morpholinosulphonyl)-anilino-methylenemalonic acid diethylester at 125° to 127° C. The 3-carbethoxy-4-hydroxy-6-(morpholinosulphonyl)-quinoline obtained from it from boiling diphenyl ether melts at 325° C. with decomposition.

EXAMPLE 6

3-Carboxy-4-hydroxy-6-[(4-methyl-1-piperazinyl)-sulphonyl]-quinoline is obtained by hydrolysis of 3-carbethoxy-4-hydroxy-6-[(4-methyl-1-piperazinyl)-sulphonyl]-quinoline as described in examples 1 to 5 for the manufacture of the compound of the formula

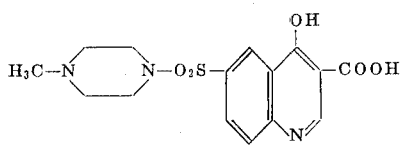

The 3-carbethoxy-4-hydroxy-6-[(4-methyl-1-piperazinyl)-sulphonyl]-quinoline used as starting material in this example is prepared as follows:

4-[(4-Methyl-1piperazinyl)-sulphonyl]-anilino-methylene-malonic acid diethyl ester is prepared as described in example 3 for the manufacture of 4-(dipropylsulphamyl)-anilino-methylene-malonic acid diethyl ester. 4-[(4-Methyl-1-piperazinyl)-sulphamyl]-acetanilide melts at 112° to 113° C. 4-[(4-methyl-1-piperazinyl)-sulphonyl]-aniline at 230° to 231° C. and the 4-[(4-methyl-1-piperazinyl)-sulphonyl]-anilino-methylenemalonic acid diethyl ester obtained from it melts at 132° to 135° C.

A solution of 15 g. of 4-[(4-methyl-1-piperazinyl)-sulphonyl]-anilino-methylenemalonic acid diethyl ester in 100 ml. of diphenyl ether is boiled for 15 minutes, cooled, then mixed with ethanol and the solid precipitate is filtered off. On recrystallization from dimethylformamide+ether there is obtained 3-carbethoxy-4-hydroxy-6-[(4-methyl-1-piperazinyl)-sulphonyl]-quinoline of the formula

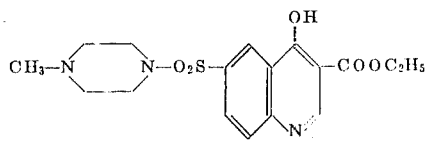

in the form of colorless crystals melting at 307° to 309° C.

EXAMPLE 7

Tablets containing 300 mg. of 3-carboxy-4-hydroxy-6-(piperidinosulphonyl)-quinoline may be prepared with the following ingredients:

| Ingredients | per tablet |
| --- | --- |
| 3-carboyx-4-hydroxy-6-(piperidinosulphonyl)-quinoline | 300 mg. |
| Lactose | 35 mg. |
| Wheat starch | 45 mg. |
| Colloidal silicic acid | 22 mg. |
| Arrowroot | 24 mg. |
| Talc | 22 mg. |
| Magnesium stearate | 2 mg. |
| | 450 mg. |

Method

The 3-carboxy-4-hydroxy-6-(piperidinosulphonyl)-quinoline is mixed with the lactose, part of the wheat starch and with colloidal silicic acid and the mixture passed through a sieve. The remaining wheat starch is pasted with five times the quantity of water on a water-bath and the powdery mixture kneaded with this paste until a weakly plastic mass is formed. The plastic mass is passed through a sieve having a mesh of about 3 mm. dried and the dry granulate passed again through a sieve. The arrowroot, talc and magnesium stearate are then added and the resulting mixture compressed into tablets weighting 450 mg.

EXAMPLE 8

In an analogous manner to that described in examples 1 to 6, 2,5-dimethyl-6-(diallysulfamyl)-3-carboxy-4-hydroxy-quinoline, 7-ethoxy-6-(thiomorpholinosulfonyl)-3-carboxy-4-hydroxy-quinoline, 8-hydroxy-6-(2,6-dimethyl-thiomorpholinosulfonyl)-3-carboxy-4-hydroxy-quinoline, 5-(trifluoromethyl)-6-(pyrrolidinosulfonyl)-3-carboxy-4-hydroxy-quinoline, 7-allyloxy-8-methyoxy-6-(hexamethyliminosulfonyl)-3-carboxy-4-hydroxy-quinoline, and 8-bromo-6-(N'-propyl-piperazinosulfonyl)-3-carboxy-4-hydroxy-quinoline may be prepared.

We Claim:

1. A member selected from the group consisting of compounds of the formula

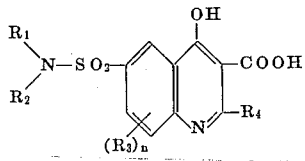

in which $R_1$ and $R_2$ each stands for a member selected from the group consisting of lower alkyl having one to seven carbon atoms and, when taken together with the nitrogen atom, form a member selected from the group consisting of lower alkyleneimino having four to six ring carbon atoms, morpholino, mono-methyl morpholino, thio-morpholino, mono- or di-methyl thio-morpholino, N'-mono-methylpiperazino and N'mono-methyl-C-mono-methyl piperazino, $R_3$ stands for a member selected from the group consisting of lower alkyl having one to six carbon atoms, lower alkoxy having one to six carbon atoms, hydroxy, halogen and trifluoromethyl, n for an integer from 0 to 3 and $R_4$ for a member selected from the group consisting of hydrogen and lower alkyl having one to three carbon atoms, and their alkali metal, alkaline earth metal and therapeutically useful acid-addition salts.

2. A product as claimed in claim 1, wherein $R_4$ stands for hydrogen and n for 0.

3. A product as claimed in claim 1, wherein $R_4$ stands for hydrogen, n for 0 and $R_1$ and $R_2$ each stands for a member selected from the group consisting of lower alkyl and, when taken together with the nitrogen atom, piperidino, mono- or di-methyl piperidino, pyrrolidino, mono-methyl pyrrolidino, hexamethyleneimino, mono-methyl hexamethyleneimino, morpholino, mono-methyl morpholino, thiomorpholino, mono- or di-methyl thiomorpholino, N-mono-methyl piperazino and N-mono-methyl-C-mono-methyl piperazino.

4. A product as claimed in claim 1, which product is the 3carboxy-4-hydroxy-6-piperidinosulphonyl-quinoline or an alkali metal, alkaline earth metal or therapeutically useful acid-addition salt thereof.

5. A product as claimed in claim 1, which product is the 3-carboxy-4-hydroxy-6-(morpholinosulphonyl)-quinoline or an alkali metal, alkaline earth metal or therapeutically useful acid-addition salt thereof.

6. A product as claimed in claim 1, which product is the 3-carboxy-4-hydroxy-6-(dimethylsulphamyl)-quinoline or an alkali metal, alkaline earth metal or therapeutically useful acid-addition salt thereof.

7. A product as claimed in claim 1, which product is the 3-carboxy-4-hydroxy-6-(diethylsulphamyl)-quinoline or an alkali metal, alkaline earth metal or therapeutically useful acid-addition salt thereof.

8. A product as claimed in claim 1, which product is the 3-carboxy-4-hydroxy-6-(dipropylsulphamyl)-quinoline or an alkali metal, alkaline earth metal or therapeutically useful acid-addition salt thereof.

9. A product as claimed in claim 1, which product is the 3-carboxy-4-hydroxy-6-[(4-methyl-1-piperazinyl)-sulphonyl]-quinoline or an alkali metal, alkaline earth metal or therapeutically useful acid-addition salt thereof.

* * * * *